United States Patent
Cha

(10) Patent No.: US 7,420,619 B2
(45) Date of Patent: Sep. 2, 2008

(54) METHOD FOR CONTROLLING PARTIAL IMAGE ENLARGEMENT IN DMB RECEIVER

(75) Inventor: Young Ho Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 11/010,031

(22) Filed: Dec. 10, 2004

(65) Prior Publication Data

US 2005/0128366 A1    Jun. 16, 2005

(30) Foreign Application Priority Data

Dec. 12, 2003   (KR) .................. 10-2003-0090706

(51) Int. Cl.
*H04N 5/44*    (2006.01)
(52) U.S. Cl. ...................................... 348/561
(58) Field of Classification Search ......... 348/561–566, 348/568, 569, 448, 581, 582, 596, 704
See application file for complete search history.

(56) References Cited

U.S. PATENT DOCUMENTS

| 4,958,229 | A | * | 9/1990 | Guillon et al. | 348/561 |
| 5,117,289 | A | * | 5/1992 | Farley et al. | 348/443 |
| 5,172,103 | A | * | 12/1992 | Kita | 345/667 |
| 5,181,110 | A | * | 1/1993 | Katsumata et al. | 348/561 |
| 6,157,414 | A | * | 12/2000 | Sakamoto | 348/581 |
| 6,195,131 | B1 | * | 2/2001 | Kaneko | 348/561 |
| 6,493,036 | B1 | * | 12/2002 | Fernandez | 348/561 |
| 6,542,201 | B1 | * | 4/2003 | Song et al. | 348/561 |
| 6,633,608 | B1 | * | 10/2003 | Miller | 375/240.02 |
| 6,678,009 | B2 | * | 1/2004 | Kahn | 348/569 |
| 7,206,029 | B2 | * | 4/2007 | Cohen-Solal | 348/565 |
| 2002/0075407 | A1 | * | 6/2002 | Cohen-Solal | 348/565 |
| 2004/0126021 | A1 | * | 7/2004 | Sull et al. | 382/233 |

* cited by examiner

*Primary Examiner*—Paulos M Natnael
(74) *Attorney, Agent, or Firm*—Lee, Hong, Degerman, Kang & Schmadeka

(57) ABSTRACT

A method for controlling partial image enlargement in a DMB receiver is provided. The method includes the steps of receiving DMB image data in real time and displaying a broadcast image on a screen; determining whether or not a partial image enlargement mode is selected by a user; displaying a window on a part of the screen if the partial image enlargement mode is determined to be selected; and converting an image in the displayed window into a full screen image and displaying the full screen image on the screen, thereby making it possible to view the enlarged partial image that is enlarged into a full screen image.

17 Claims, 8 Drawing Sheets

(a)

(b)

METHOD FOR CONTROLLING PARTIAL IMAGE ENLARGEMENT IN DMB RECEIVER

Pursuant to 35 U.S.C. §119(a), this non-provisional patent application claims the benefit of the earlier filing date and right of priority of Patent Application No. 10-2003-0090706, filed in Republic of Korea on Dec. 12, 2003, the entire contents of which are hereby incorporated by reference.

BACKGROUND OF THE INVENTION

1. Field of the Invention

The present invention relates to a digital multimedia broadcasting (DMB) receiver, and more particularly, to a method for controlling partial image enlargement in a DMB receiver making it possible to enlarge a partial image selected by a user out of a broadcast image and to display the enlarged partial image.

2. Description of the Related Art

Recently, standardization and commercialization of a digital audio broadcast is being globally promoted. Europe adopts Eureka-147 as a digital audio broadcast standard and uses a digital audio broadcasting (DAB) system, America uses a digital audio radio (DAR) system, Canada uses a digital radio broadcasting (DRB) system, the international telecommunication union-radio communication sector (ITU-R) uses a digital sound broadcasting (DSB) system and Korea adopts and uses a digital multimedia broadcasting (DMB) system.

The DAB system has been developed as the next-generation broadcasting system. The DAB system is robust against radio environments and noises in the downtown, and thus makes it possible to receive CD-quality audio signals in a vehicle driving at a high speed although broadcasting signals are transmitted at low output power. Also, the DAB system has expanded the existing audio radio broadcasting concept into an audio/video radio broadcasting concept, and makes it possible to transmit various multimedia information such as news, traffic information, weather information, geographic position information and motion picture information by character and graphic, in addition to a music broadcast.

In the meantime, the DMB system also has been developed as the next-generation broadcasting system. With digitalization of audio broadcasting, the DMB system exceeds the existing AM/FM radio broadcasting system and makes it possible to transmit CD-quality audio signals, characters or graphics and motion pictures at 1.5 Mbit/s, thereby enabling various data services, a bidirectional broadcasting service and a superior mobile reception quality The DMB service can be broadly divided into a terrestrial DMB service and a satellite DMB service according to its transmission medium types, and the satellite DMB service can be subdivided into a stationary satellite DMB service and a mobile satellite DMB service The European broadcasting union (EBU) and the ITU-R have recommended the required characteristics of the DMB system as follows:

1. The DMB system should be realized by a digital transmission scheme guaranteeing a high broadcast quality, should be continuously acceptable during the next 50 years, and should provide a high-quality sound of 2 or more channels.

2. The DMB system should make it possible to errorlessly receive a broadcast signal also by a portable terminal in a driving vehicle That is, the DMB system should enables mobile reception, portable reception and stationary reception.

3. The DMB system should make it possible to provide a PAD (program associated data) channel service for transmitting additional data by a normal broadcast program and a Non-PAD channel service for an independent broadcast program. Accordingly, the DMB system should be able to recognize radio signal data, character data and program data.

4. The DMB system should be high in its transmission capacity and efficiency so as to be able to accommodate various data channel capacities and to increase frequency usage efficiency.

A DMB receiver for the DMB system is also being commercialized. For example, a DMB receiver built in a portable terminal, such as a personal digital assistant (PDA), or a vehicle terminal has been already launched.

Also in the DMB system, a CODEC (coder and decoder) of a DMB receiver decodes a received broadcast image signal into a screen image standardized according to a display screen size. That is, if image data constituting one screen image is 320×240 in its size, the image data is displayed through an image display device such as a liquid crystal display (LCD) or a cathode ray tube (CRT) in such a way that a received source image is displayed as it is received in the DMB receiver.

However, there has been no method capable of enlarging a desired partial image out of a source image (i.e., broadcast signals) received in real time and displaying the enlarged partial image.

SUMMARY OF THE INVENTION

Accordingly, the present invention is directed to a method for controlling partial image enlargement in a DMB receiver, which substantially obviates one or more problems due to limitations and disadvantages of the related art.

An object of the present invention is to provide a method for enlarging a desired partial image out of a real-time DMB image and displaying the enlarged partial image.

Another object of the present invention is to provide a method for displaying a window on a screen by using a PIP screen when a partial image enlargement mode is selected by a user, enlarging a partial image of the displayed window into a full screen image and displaying the enlarged full screen image.

A further object of the present invention is to provide a method for enabling a user to freely adjust the size and position of a window for a partial image enlargement mode.

A further another object of the present invention is to provide a method for using a window's center position, width and height as window information and reflecting the window's adjusted center position, width and height on the window information.

A still another object of the present invention is to provide a method for converting a full image display mode into a partial image enlargement mode, and vice versa.

A yet another object of the present invention is to provide a method for reconverting a partial image enlargement mode into a full image display mode with a mode cancel key during the partial image enlargement mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling partial image enlargement in a DMB receiver includes the steps of: receiving DMB image data in real time and displaying a broadcast image on a screen; determining whether or not a partial image enlargement mode is selected by a user; displaying a window on a part of the screen if the partial image enlargement mode is determined to be selected; and converting an image in the displayed window into a full screen image and displaying the full screen image on the screen.

In another aspect of the present invention, a method for controlling partial image enlargement in a DMB receiver includes the steps of: receiving DMB image data in real time and displaying a broadcast image on a screen; determining whether or not a partial image enlargement mode is selected by a user; displaying a window on a part of the screen if the partial image enlargement mode is determined to be selected; adjusting by a user the displayed window's position and/or size; determining whether or not a key signal is inputted by the user during a predetermined time interval after the adjustment step; and converting a partial image in a finally-displayed window region into a full screen image and displaying the full screen image on the screen if the key signal is determined to be not inputted during the predetermined time interval.

In further another aspect of the present invention, a method for controlling partial image enlargement in a DMB receiver includes the steps of: receiving DMB image data in real time and displaying a broadcast image on a screen; converting a full image display mode into a partial image enlargement mode if a mode conversion key is inputted by a user during the full image display mode; and converting the partial image enlargement mode into the full image display mode if a mode conversion key is inputted by a user during the partial image enlargement mode.

The present invention enables a user to select a desired partial image out of a real-time broadcast image by adjustment of a window's position and size and to enlarge the selected partial image into a full screen image and to then view the enlarged image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
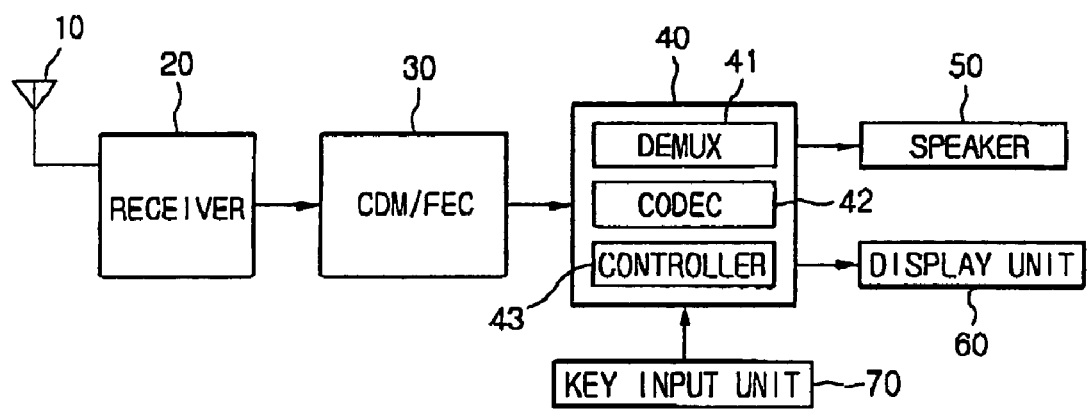
FIG. 1 is a schematic block diagram of a DMB receiver according to an embodiment of the present invention.

FIG. 1 is a block diagram of a DMB receiver according to an embodiment of the present invention.

Referring to FIG. 1, a DMB receiver receives various contents, which have been transmitted from a DMB center to a DMB satellite and a DMB base station, from the DMB satellite and the DMB base station. For this, the DMB receiver is constructed to include an antenna 10, a receiver 20, a modem 30, a multimedia module 40, a speaker 50, a display unit 60 and a key input unit The antenna 10 receives signals from a DMB satellite and a DMB base station. Here, the DMB satellite receives various contents such as a high-quality sound, various data information (such as traffic information, weather information and game information) and a broadcast motion picture (such as a movie and a sports program) from a DMB center, and then transmits the same to a mobile terminal and a vehicle receiver.

The receiver 20 selects a broadcast channel from received radio frequency (RF) signals, and converts the RF signals into intermediate frequency (IF) signals.

The modem 30 includes a code division multiplexing/forward error correction (CDM/FEC) module. In general, the satellite DMB system multiplexes one broadcast program into N CDM channels, and the N CDM channels each is divided into a pilot channel, a program specific information/system information (PSI/SI) channel, and an image/voice channel.

Accordingly, so as to receive one broadcast program, the modem 30 includes N CDM parts and N FEC parts for receiving N CDM channels. That is, since one CDM channel is constructed by combination of one CDM part and one FEC part, the modem 30 should be constructed by N CDM parts and N FEC parts for receiving N channels.

Here, the CDM part demodulates a CDM signal received from the receiver 20, and the FEC part error-corrects the CDM demodulation signal to then generate a pilot payload or an MPEG-2 transport bit stream from the CDM demodulation signal according to respective channel characteristics.

The multimedia module 40 includes a DEMUX part 41, a CODEC part 42 and a controller 43. The DEMUX part 41 demultiplexes a MPEG-2 transport stream out of signals outputted from the FEC part. The CODEC part 42 decodes the demultiplexed transport stream Here, the decoded stream data is divided into a voice and an image, and the voice and the image are respectively outputted to the speaker 50 and the display unit 60.

At this time, the controller 43 controls an over operation of the DMB receiver. Specifically, the controller 43 controls conversion between a full image display mode and a partial image enlargement mode according to key input signals of a user.

Here, the CODEC part 42 has a re-sizing function for the present invention to thereby decode data according a current screen size or decode a partial image into a full screen image according to window information inputted by a user for partial image enlargement. The re-sizing function can also be realized by a separate digital signal processor (DSP).

The present invention includes a technical construction identical or similar co the above-stated DMB receiver, and a partial image enlargement function. Here, a use can activate and control the partial image enlargement function by using a hot key of the key input unit 70 or a menu on a user interface (UI).

Reference will now be made in detail to a method for controlling partial image enlargement in the DMB receiver according to the present invention.

FIRST EMBODIMENT

Figure 2:
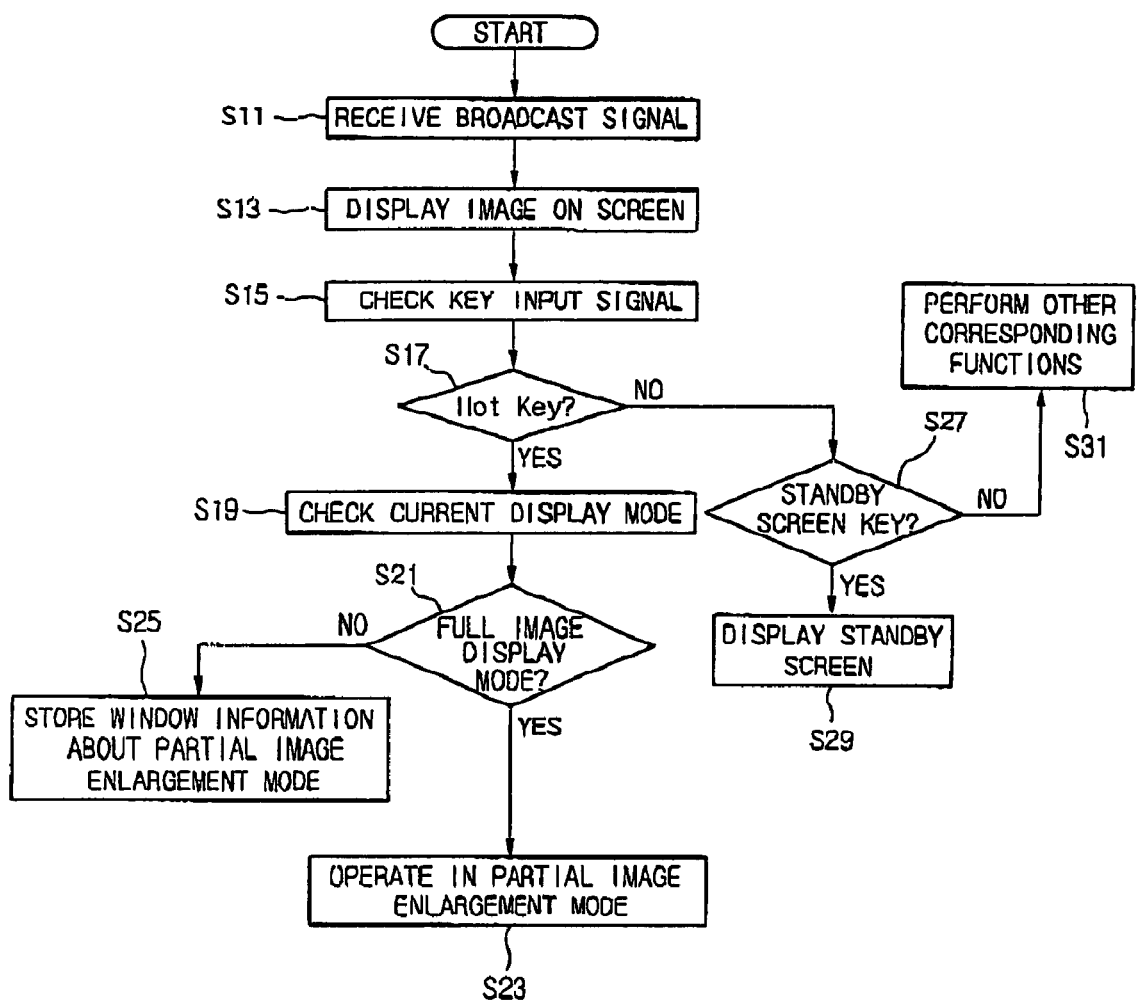
FIG. 2 is a flow diagram illustrating an operation of an image display mode according to a partial image enlargement mode and a full image display mode in a DMB receiver, according to a first embodiment of the present invention.

FIG. 2 is a flow diagram illustrating an operation of an image display mode according to a partial image enlargement mode and a full image display mode in a DMB receiver, according to a first embodiment of the present invention.

Referring to FIG. 2, the DMB receiver first receives a real-time broadcast signal (S11), and the real-time broadcast signal is displayed on a screen according to a broadcast viewing mode (S13). At this time, the DMB receiver (for example, the controller 43) checks a key input signal of a user (S15), and determines from the check result of the step S15 whether or not the key input signal is a hot key signal for partial image enlargement (S17).

If the key input signal is determined to be the hot key signal in the step S17, the DMB receiver checks a current image display mode (S19). If the current image display mode is determined to be a normal display mode (i.e., full image display mode) in the step S19 (S21), the full image display mode is converted into a partial image enlargement mode (S23). If the current image display mode is determined to be not a full image display mode but a partial image enlargement mode in step S21, window information about the current partial image enlargement mode is stored (S25). Here, the window information includes a center position of a partial image window, the window's width from the center position, and the window's height from the center position.

On the contrary, if the key input signal is determined to be not the hot key signal in the step S17, the DMB receiver further determines whether or not the key input signal is a standby screen key signal (S27). If the key input signal is determined to be a standby screen key signal in the step S27, a standby screen is displayed (S29) Otherwise, if the key input signal is determined to be not a standby screen key signal in step S27, other functions corresponding to the types of the key input signal are performed (S31).

In the first embodiment, when a user select a hot key for partial image enlargement in the DMB receiver, the DMB receiver determines whether a current image display mode is a full image display mode, a partial image enlargement mode, a standby screen mode, or the like to then perform an operation corresponding to the determined mode.

That is, if a current image display mode is a full image display mode when the hot key is selected, a partial image enlargement function is performed. Otherwise, if a current image display mode is a partial image enlargement mode when the hot key is selected, window information about a current partial image is stored.

Here, the hot key is a key installed at the outside of the DMB receiver, for partial image enlargement. A partial image enlargement mode is entered when the hot key is pressed once, and then window information about a current partial image is stored when the hot key is pressed once again.

Also, a partial image enlargement function can be realized by a menu of a terminal's UI, as well as by the hot key, and the partial image enlargement function can be performed by selecting a partial image enlargement item out of the menu.

An identifier (for example, icon) for identifying current image display modes (i.e., a normal display mode, a partial image enlargement mode and a standby screen mode) is displayed on a part of a screen of an image display device (for example, LCD), whereby a user can conveniently identify current image display modes and activate a desired image display mode.

SECOND EMBODIMENT

Figure 3:
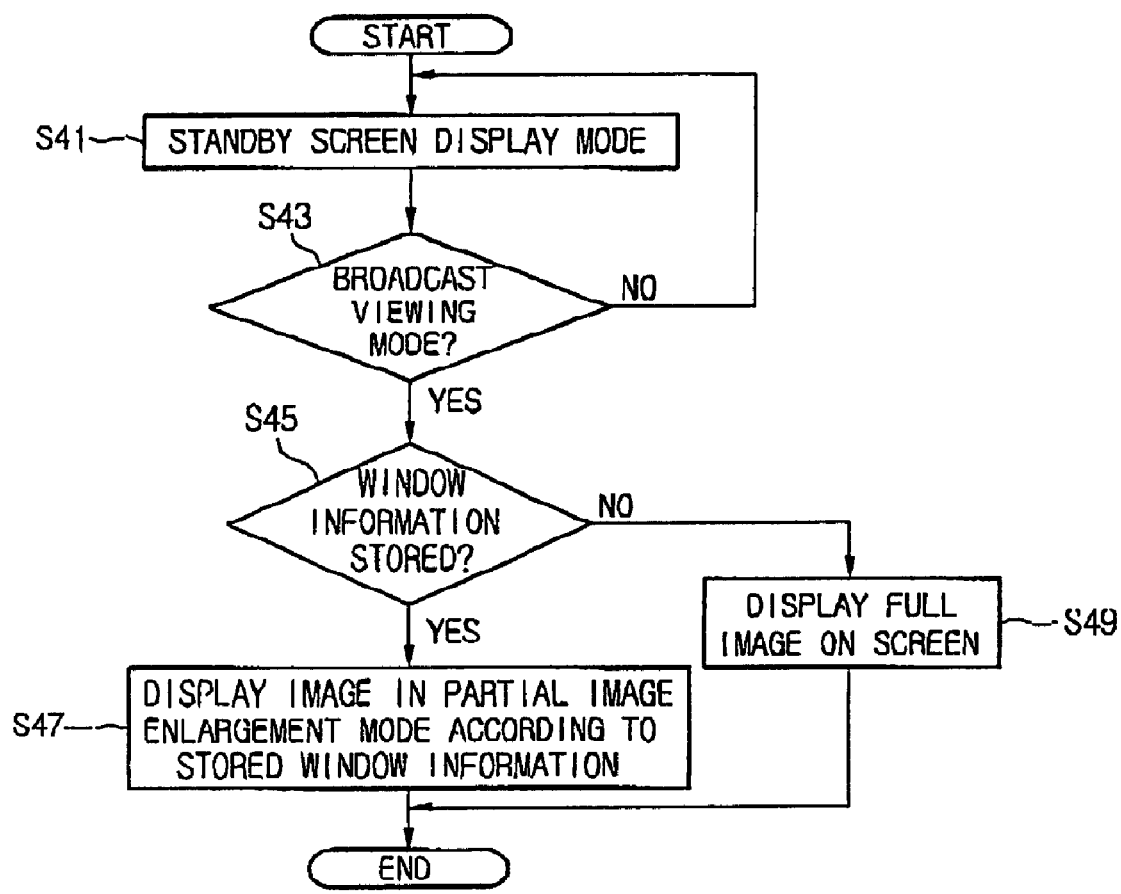
FIG. 3 is a flow diagram illustrating a method for controlling partial image enlargement on a standby screen in a DMB receiver, according to a second embodiment of the present invention.

FIG. 3 is a flow diagram illustrating a method for controlling partial image enlargement on a standby screen in a DMB receiver, according to a second embodiment of the present invention.

Referring to FIG. 3, the DMB receiver determines in a standby screen display mode (S41) whether or not a user selects a broadcast viewing mode (S43). If a broadcast viewing mode is determined to be selected by a user in the step S43, the DMB receiver further determines whether the selected broadcast viewing mode is a partial image enlargement mode or a normal broadcast viewing mode, by discerning whether or not window information about a partial image has been already stored (S45).

If the window information is determined to have been already stored in the step S45, the DMB receiver displays a broadcast image in a partial image enlargement mode according to the stored window information (S47) otherwise, if the window information is determined to have not been stored in the step S45, the DMB receiver displays a full image on its screen to thereby display a broadcast image in a normal broadcast viewing mode (S49).

Here, if a user temporarily converts an image display mode from a current partial image enlargement mode into a Standby screen display mode, window information about the current partial image can be automatically stored or can be stored by a key pressed by the user. At this time, if the user reconverts the image display mode from the standby screen display mode into a broadcast viewing mode, the DMB receiver determines whether or not previously-stored window information exists If the previously-stored window information is determined to exist, the DMB receiver can continuously perform a partial image enlargement function according to the previously-stored window information.

THIRD EMBODIMENT

Figure 4:
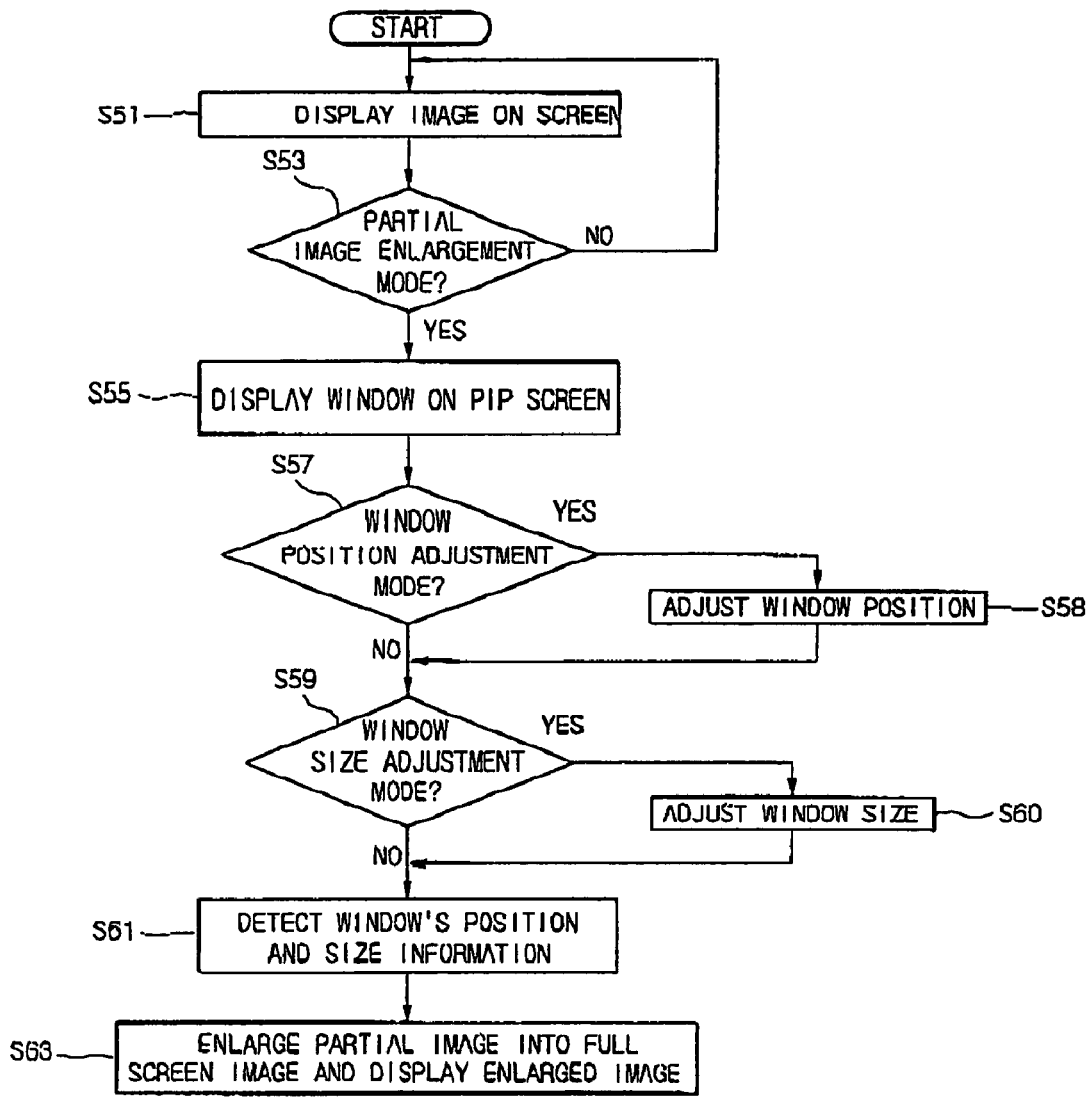
FIG. 4 is a flow diagram illustrating a method for controlling partial image enlargement in a DMB receiver, according to a third embodiment of the present invention.

FIG. 4 is a flow diagram illustrating a method for controlling partial image enlargement in a DMB receiver, according to a third embodiment of the present invention.

Referring to FIG. 4, the DMB receiver displays a broadcast image on its screen (S51). The DMB receiver then determines whether or not a user selects a partial image enlargement mode (S53). If a partial image enlargement mode is determined to be selected by the user in the step S53, the DMB receiver displays a window on a PIP (picture in picture) screen (S55) of a broadcast screen. At this time, information about the displayed window is automatically transmitted to the CODEC part 42 of the DMB receiver.

Here, the window's default shape, size and display position are preset For example, the window's default shape is a square. Here, only the square's frame line is white and the square's interior is transparent for minimizing interference with a currently-displayed broadcast image. Also, the window's default size is about one fourth (¼) of a full screen's size, and the window's default display position is a lower right end of the full screen. The window's default size is about ¼ so as to enable the user to rapidly enlarge or reduce the window's size.

After the step S55, the DMB receiver determines whether or not a window position adjustment mode is entered by the user (S57). If a window position adjustment mode is determined to be entered in step S57, the DMB receiver adjusts the window's display position vertically or horizontally (S51)). Here, the window's display position can be vertically or horizontally adjusted with direction keys of the DMB receiver. If the DMB receiver is not equipped with direction keys, the window's display position may be adjusted with numeral keys on a key matrix of the DMB receiver.

Thereafter, the DMB receiver determines whether or not a window size adjustment mode is entered by the user (S59). If a window size adjustment mode is determined to be entered in step S59, the DMB receiver enlarges or reduces the window's size (S60). For example, the window's size can be enlarged or reduced by a predetermined scale factor with a zoom-in key or a zoom-out key of the DMB receiver.

Also, the window's size can be enlarged or reduced at a desired direction with the directions keys and the zoom-in/out keys. For example, if an up key (▲) is pressed while the zoom-in key is pressed, the window's upper frame line is moved up, and if a down key (▼) is pressed while the zoom-out key is pressed, the window's upper frame line in moved down. Also, if a left key (◄) is pressed while the zoom-in key is pressed, the window's left frame line is moved left, and if a right key (►) is pressed while the zoom-out key is pressed, the window's left frame line is moved right. Here, not only the window's upper or left frame line but also the window's lower or left frame line can be partially moved vertically or horizontally by using the above-described method or a tap. Exceptionally, if a frame line of the window and a frame line of the full screen overlap each other, the frame line of the window can not be moved through the frame line of the full screen.

In the meantime, after termination of the window's position and/or size adjustment, the CODEC part 42 of the DMB receiver detects varied information out of the window's position and/or size information (S61). Here, instead of receiving the window's position and size information while the window is displayed on the PIP screen, the DMB receiver may receive the window's finally-varied position and size information in step S61. Also, if the window's position and size have not been adjusted, the DMB receiver uses the default window information of the PIP screen. Otherwise, if the window's position and size have been adjusted, the DMB receiver uses the window's adjusted position and size as new window information.

Here, the CODEC part 42 receives the windows adjusted position and size information. The window's position information is a center position of the window, and the window's size information includes the window's width and height.

Thereafter, when the window's position and size information is detected by the CODEC part 42, the DMB receiver enlarges an image (i.e., partial image) corresponding to the window's region into a full screen image and displays the enlarged image on the full screen (S63).

FOURTH EMBODIMENT

Figure 5:
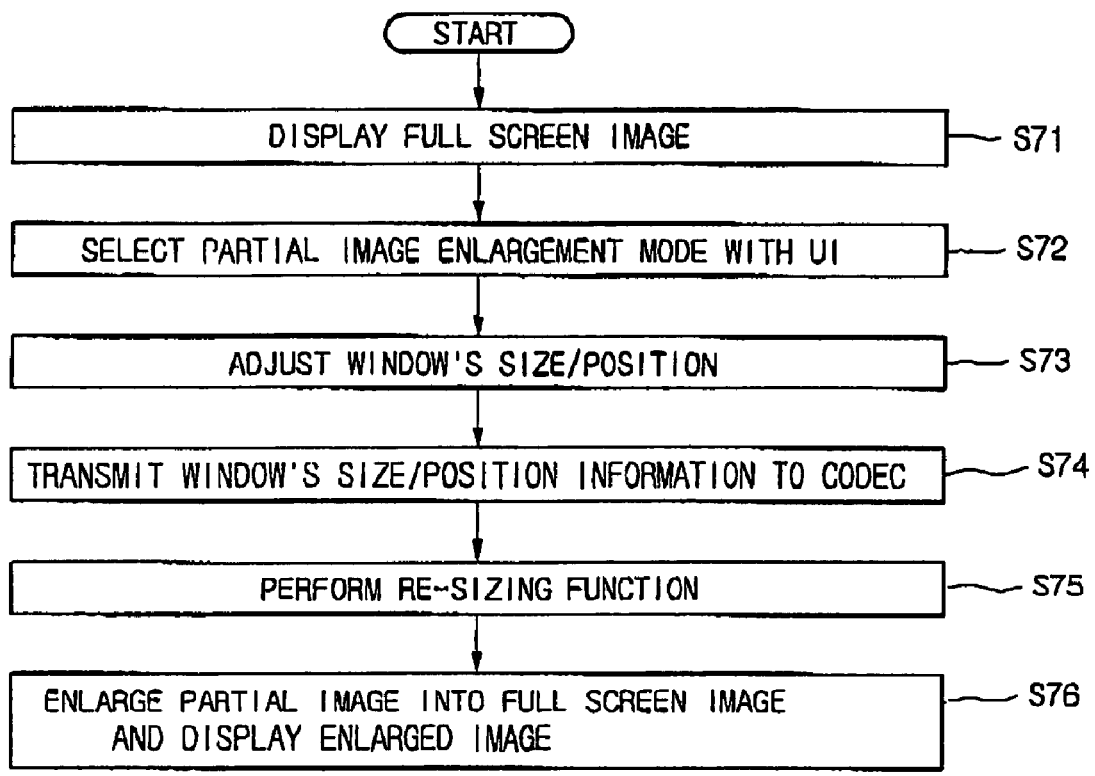
FIG. 5 is a flow diagram illustrating a method for controlling partial image enlargement in a DMB receiver, according to a fourth embodiment of the present invention.

FIG. 5 is a flow diagram illustrating a method for controlling partial image enlargement in a DMB receiver, according to a fourth embodiment of the present invention.

Referring to FIG. 5, when a broadcast image is displayed on a full screen of the display device (S71), a user selects a partial image enlargement mode by using a partial image enlargement item out of the menu on the UI (S72).

After the partial image enlargement mode is selected, the size and position of a window displayed on a PIP screen are adjusted by the user (S73). After the window's size and position are adjusted, the CODEC part 42 receives the window's adjusted size and position information (S74).

Here, the window' position is freely moved by a predetermined step with the up/down/left/right direction keys (▲/▼/◄/►), and the window' size is freely adjusted by a predetermined scale factor with the zoom-in/out keys. At this time, the window's size can be adjusted after the window's position is adjusted, and vice verse. At this time, the window contains a desired partial image.

At this time, the CODEC part 42 performs a re-sizing function by using the received window information (S75) to thereby enlarge the desired partial image into a full screen image, and the enlarged image is then displayed on the display unit 60 of the DMB receiver (S76). At this time, in case where a key for window adjustment is not inputted during a predetermined time interval, the display unit 60 automatically converts its image display mode into a partial image enlargement mode.

As stated above, a full screen image display mode can be converted into a partial image enlargement mode, and vice versa. This conversion between the full screen image display mode and the partial image enlargement mode will now be described with reference to FIG. 6.

FIFTH EMBODIMENT

Figure 6:
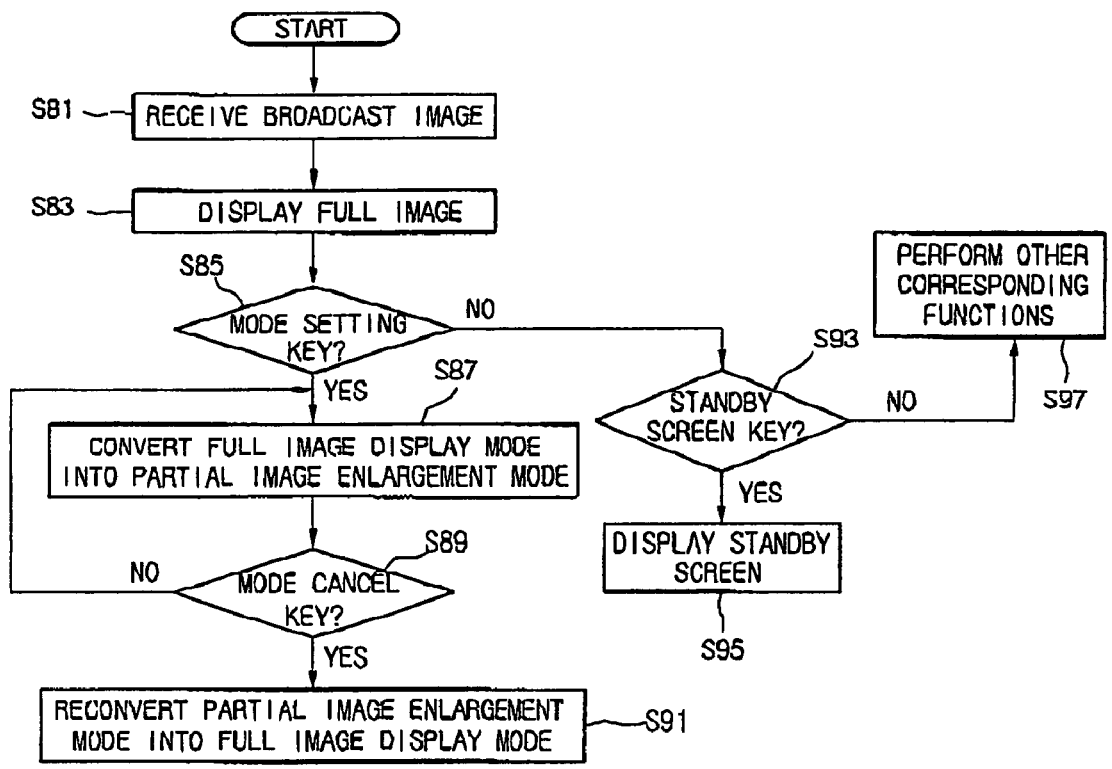
FIG. 6 is a flow diagram illustrating a method for converting an image display mode between a full image display mode and a partial image enlargement mode in a DMB receiver, according to a fifth embodiment of the present invention.

FIG. 6 is a flow diagram illustrating a method for converting an image display mode between a full image display mode and a partial image enlargement mode in a DMB receiver, according to a fifth embodiment of the present invention.

Referring to FIG. 6, the DMB receiver receives a broadcast image and then displays the received broadcast image on a full screen according to a full image display mode (S81 and S83). The DMB receiver then determines whether or not a key signal inputted by a user is a mode setting key signal (S85). If the key input signal is determined to be the mode setting key signal in step S85, the DMB receiver converts the full image display mode into a partial image enlargement mode to thereby enlarge and display a predetermined partial image (S87). Here, when the user pre-stores window information corresponding to the partial image enlargement mode and then presses the mode setting key, the DMB receiver enlarges and displays a partial image by using the pre-stored window information. For example, the mode setting key may be operated by the hot key or the partial image enlargement item of the menu on the UI.

Thereafter, the DMB receiver determines whether or not a mode cancel key is inputted by the user during the partial image enlargement mode (S89). If the mode cancel key is determined to be inputted in step S89, the DMB receiver reconverts the partial image enlargement mode into the full image display mode (S91). That is, the mode cancel key is used for converting the partial image enlargement mode into the full image display mode (i.e., normal display mode), and may be realized by the hot key or a separate key.

In this manner, the full image display mode is converted into the partial image enlargement mode by the mode setting key, and the partial image enlargement mode is converted into the full image display mode by the mode cancel key.

On the contrary, if the key input signal is determined to be not the mode setting key in step S85, the DMB receiver further determines whether or not the key input signal is a standby screen key signal (S93). If the key input signal is determined to be the standby screen key signal in step S93, a standby screen is displayed (S95). Otherwise, if the key input signal is determined to be not the standby screen key signal in step 693, other functions corresponding to the types of the key input signal are performed (S97).

As stated above, when the DMB receiver receives a real-time broadcast image and displays the received image on its screen, the user can conveniently select the full image display mode or the partial image enlargement mode. Also, the user can freely adjust the window information for the partial image enlargement mode. Further, the user can easily activate the partial image enlargement mode by storing the window information corresponding to the partial image enlargement mode.

Figure 7:
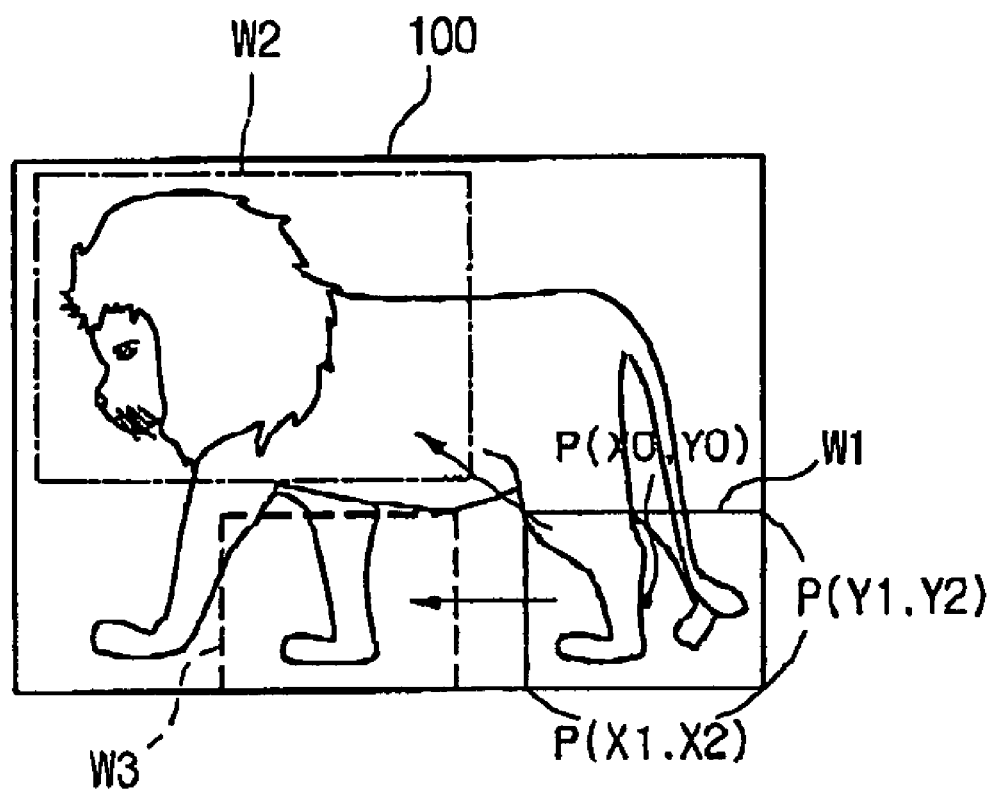
FIG. 7 is a diagram illustrating an example of adjusting a partial image window in a screen according to an embodiment of the present invention.

FIG. 7 is a diagram illustrating an example of adjusting a partial image window in a screen according to an embodiment of the present invention.

Referring to FIG. 7, a window W1 generated by selection of a partial image enlargement mode by a user is displayed on a broadcast screen 100 (or a full image screen 100). Information about the window W1 includes a center position P(X0, Y0), a width P(X1,X2) and a height P(Y1,Y2). Here, the center position P(X0,Y0) is a default value, and values or the width P(X1,X2) and the height P(Y1,Y2) can be respectively obtained from absolute values (|X1−X2| and |Y1−Y2|) of respective coordinates' values. Here, a window's position and size can be varied according to the window's center position, width and height that are selected and stored by the user. The window W1 can be moved into a window W3 by pressing the left key ◀. Also, the window W1 can be moved and expanded into a window T2 by associatively pressing the direction keys ▲/▼/◀/▶ and the zoom-in key (and if necessary also the zoom-out key).

Figure 8:
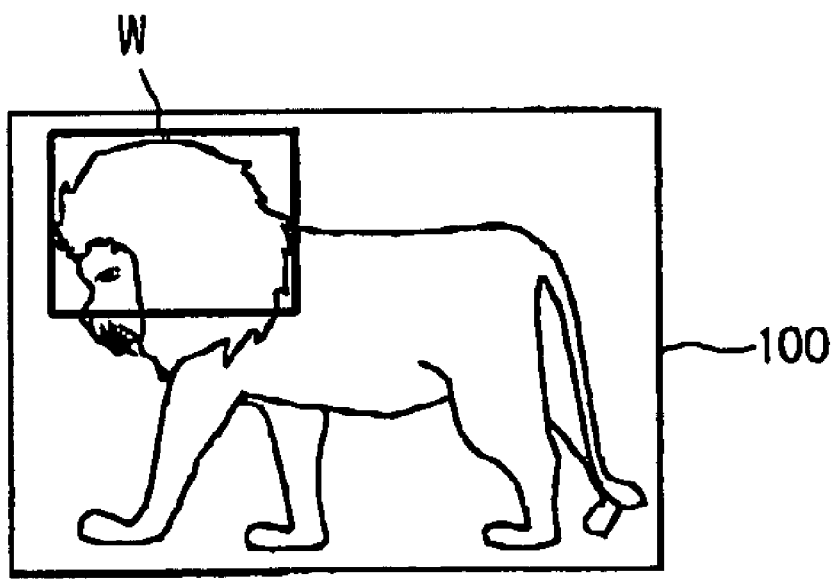
FIG. 8 is a diagram illustrating an example of enlarging a partial image window in a screen according to an embodiment of the present invention.
Figure 8:
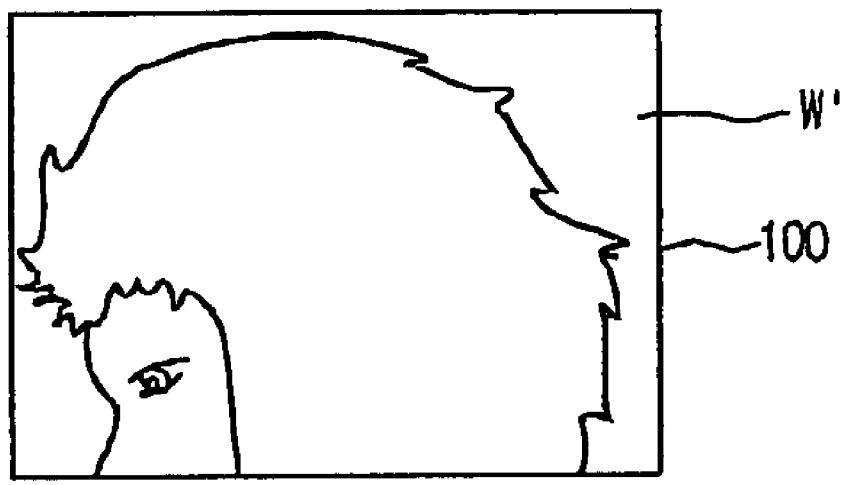

FIG. 8 is a diagram illustrating an example of enlarging a partial image window and displaying the enlarged partial image on a full screen by conversion of a full image display mode into a partial image enlargement mode, according to an embodiment of the present invention.

Referring to FIG. 8, FIG. 8A illustrates a state where a window's partial image w is selected in a full image screen 100, and FIG. 8B illustrates a state where the selected window's partial image W is enlarged into a full screen image W' according to a partial image enlargement mode after a predetermined time interval from the selection of the partial image W.

As described previously, the present invention enables a user to select a desired partial image from a displayed DMB image by using a window, and to minutely view the desired partial image by randomly adjusting the window's size and position.

Also, the present invention enables a user to enlarge a desired partial image out of a full broadcast image and to view the enlarged partial image when the user cannot see a minute part of the full broadcast image at a distance due to a limited size of a portable terminal LCD.

Further, the present invention provides a partial image enlargement mode and a partial image enlargement cancel mode to the DMB receiver, thereby enabling a user to selectively use a full image display mode and a partial image enlargement mode. Furthermore, the present invention enables a user to store window information for partial image enlargement in a DMB receiver and to then conveniently use a partial image enlargement mode by a hot key without adjusting the window.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for controlling partial image enlargement in a DMB (digital multimedia broadcasting) receiver, the method comprising:
   receiving DMB image data in real time and displaying a broadcast image on a screen;
   determining that a partial image enlargement mode is selected by a user;
   displaying a window on a portion of the screen;
   adjusting at least one of the displayed window's position and size according to the user's input;
   determining that a key signal is received from the user during a predetermined time interval after adjusting the window's position; and
   converting an image in the displayed window into a full screen image and displaying the full screen image on the screen.

2. The method according to claim 1, wherein the window is displayed on a lower part of the screen, the window's shape is a square of a predetermined size, and the square's frame line has a predetermined color.

3. The method according to claim 1, wherein the window is displayed with a PIP (picture in picture) screen.

4. The method according to claim 1, wherein the user's input are received via at least one of direction keys and zoom-in/out keys of the DMB receiver.

5. The method according to claim 1, wherein the information related to the displayed window is transmitted to a CODEC part of the DMB receiver when displayed on the screen or adjusted.

6. The method according to claim 5, wherein the CODEC part re-sizes a partial image corresponding to a current window region into a full screen image by using information related to the displayed window.

7. The method according to claim 5, wherein the information related to the displayed window comprises at least one of a center position, width and height.

8. A method for controlling partial image enlargement in a DMB (digital multimedia broadcasting) receiver, the method comprising the steps of:
   receiving DMB image data in real time and displaying a broadcast image on a screen;
   determining whether or not a partial image enlargement mode is selected by a user;
   displaying a window on a part of the screen if the partial image enlargement mode is determined to be selected;
   adjusting by the user the displayed window's position and/or size;
   determining whether or not a key signal is inputted by the user during a predetermined time interval after the adjustment step; and converting a partial image in a finally-displayed window region into a full screen image and displaying the full screen image on the screen if the key signal is determined to be not inputted during the predetermined time interval.

9. The method according to claim 8, wherein the window is displayed on a lower part of the screen, and the window's size is one fourth (¼) of the screen's size.

10. The method according to claim 8, wherein the window's information comprises the window's center position, width and height.

11. The method according to claim 8, wherein if the window's position and/or size is adjusted, only the adjusted window's position and/or size is transmitted to a CODEC part of the DMB receiver, and the CODEC part re-sizes the partial image.

12. The method according to claim 8, wherein the window's position is moved by a predetermined step with up/down/left/right direction keys, and the window's size is expanded or reduced by a predetermined scale factor with zoom-in/out keys.

13. The method according to claim 8, wherein an identifier is displayed on a part of a screen of an image display device, the identifier being used for identifying whether a current image display mode is a full image display mode or a partial image enlargement mode.

14. The method according to claim 8, further comprising the steps of:

temporarily storing the window's information for the partial image enlargement mode if a key for conversion to a standby screen is inputted while an image is displayed in the partial image enlargement mode; and displaying an image in the partial image enlargement mode by using the window's information if a key for conversion to a broadcast viewing mode is inputted.

15. The method according to claim 8, wherein the partial image enlargement mode is converted into the full image display mode if a mode cancel key is inputted.

16. A method for controlling partial image enlargement in a DMB (digital multimedia broadcasting) receiver, the method comprising the steps of:

receiving DMB image data in real time and displaying a broadcast image on a screen;

converting a full image display mode into a partial image enlargement mode if a mode conversion key is input by a user during the full image display mode; and converting the partial image enlargement mode into the full image display mode if a mode conversion key is input by the user during the partial image enlargement mode, wherein an icon indicating the full image display mode or the partial image enlargement mode according to present display mode is displayed on a lower portion of the screen.

17. The method according to claim 16, wherein the partial image enlargement mode converts a partial image into a full image by using pre-stored window information.

* * * * *